(12) United States Patent
Williams et al.

(10) Patent No.: US 7,256,780 B2
(45) Date of Patent: Aug. 14, 2007

(54) VISUALIZATION OF VOLUME-RENDERED DATA WITH OCCLUDING CONTOUR MULTI-PLANAR-REFORMATS

(75) Inventors: James P. Williams, Princeton, NJ (US); Klaus D. Engel, West Windsor, NJ (US); Gianluca Paladini, Princeton, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 212 days.

(21) Appl. No.: 11/065,728

(22) Filed: Feb. 25, 2005

(65) Prior Publication Data

US 2005/0195190 A1    Sep. 8, 2005

Related U.S. Application Data

(60) Provisional application No. 60/550,134, filed on Mar. 4, 2004.

(51) Int. Cl.
    *G06T 17/00* (2006.01)
(52) U.S. Cl. ........................................ 345/424
(58) Field of Classification Search .............. None
    See application file for complete search history.

(56) References Cited

U.S. PATENT DOCUMENTS

| | | | | |
|---|---|---|---|---|
| 4,821,213 | A * | 4/1989 | Cline et al. | 345/424 |
| 5,748,193 | A * | 5/1998 | Higashi et al. | 345/427 |
| 5,793,375 | A * | 8/1998 | Tanaka | 345/426 |
| 5,966,134 | A * | 10/1999 | Arias | 345/589 |
| 5,986,662 | A * | 11/1999 | Argiro et al. | 345/424 |
| 6,674,430 | B1 * | 1/2004 | Kaufman et al. | 345/419 |
| 6,785,409 | B1 * | 8/2004 | Suri | 382/128 |
| 7,061,484 | B2 * | 6/2006 | Bailey et al. | 345/419 |

OTHER PUBLICATIONS

James Arvo and Kevin Novins, "Iso-Contour Volume Rendering," Oct. 1994, In 1994 ACM/IEEE Symposium on Volume Visualization.*

Armin Kanitsar, Rainer Wegenkittl, Petr Felkel, Dominik Fleischmann, Dominique Sandner and Eduard Grplller, "Computed Tomography Angiography: A Case Study Of Peripheral Vessel Investigation," Oct. 21, 2001, In Proceedings Visualization 2001, p. 477-480.*

Armin Kanitsar, Dominik Fleischmann, Rainer Wegenkittl, Petr Felkel, Meister Eduard Gröller, "CPR Curved Planar Reformation" Oct. 2002, IEEE Visualization '02, p. 37-44.*

Raghav Raman, MD, Sandy Napel, PhD, Christopher F. Beaulieu, MD, PhD, Eric S. Bain, MD, R. Brooke Jeffrey, Jr, MD and Geoffrey D. Rubin, MD, "Automated Generation of Curved Planar Reformations from Volume Data: Method and Evaluation," Apr. 2002, Radiology, p. 275-280.*

* cited by examiner

*Primary Examiner*—Ulka Chauhan
*Assistant Examiner*—Jason M Repko
(74) *Attorney, Agent, or Firm*—Donald B. Paschburo; F. Chau & Associates, LLC

(57) ABSTRACT

An apparatus and method for visualizing volume rendered images relative to a viewing vector are provided, where the apparatus includes a processor, a detection unit in signal communication with the processor for detecting occluding contours of opacified structures in the image data, and a resampling unit in signal communication with the processor for generating curved multi-planar-reformat (MPR) resamplings that follow the occluding contours of the opacified structures; and the method includes receiving a volume rendered image, including distance values and surface normals for every pixel that is opacified, gathering all opacified pixels that are orthogonal to the viewing vector into a group of occluding points, and separating the group of occluding points into individual occluding contours.

17 Claims, 5 Drawing Sheets

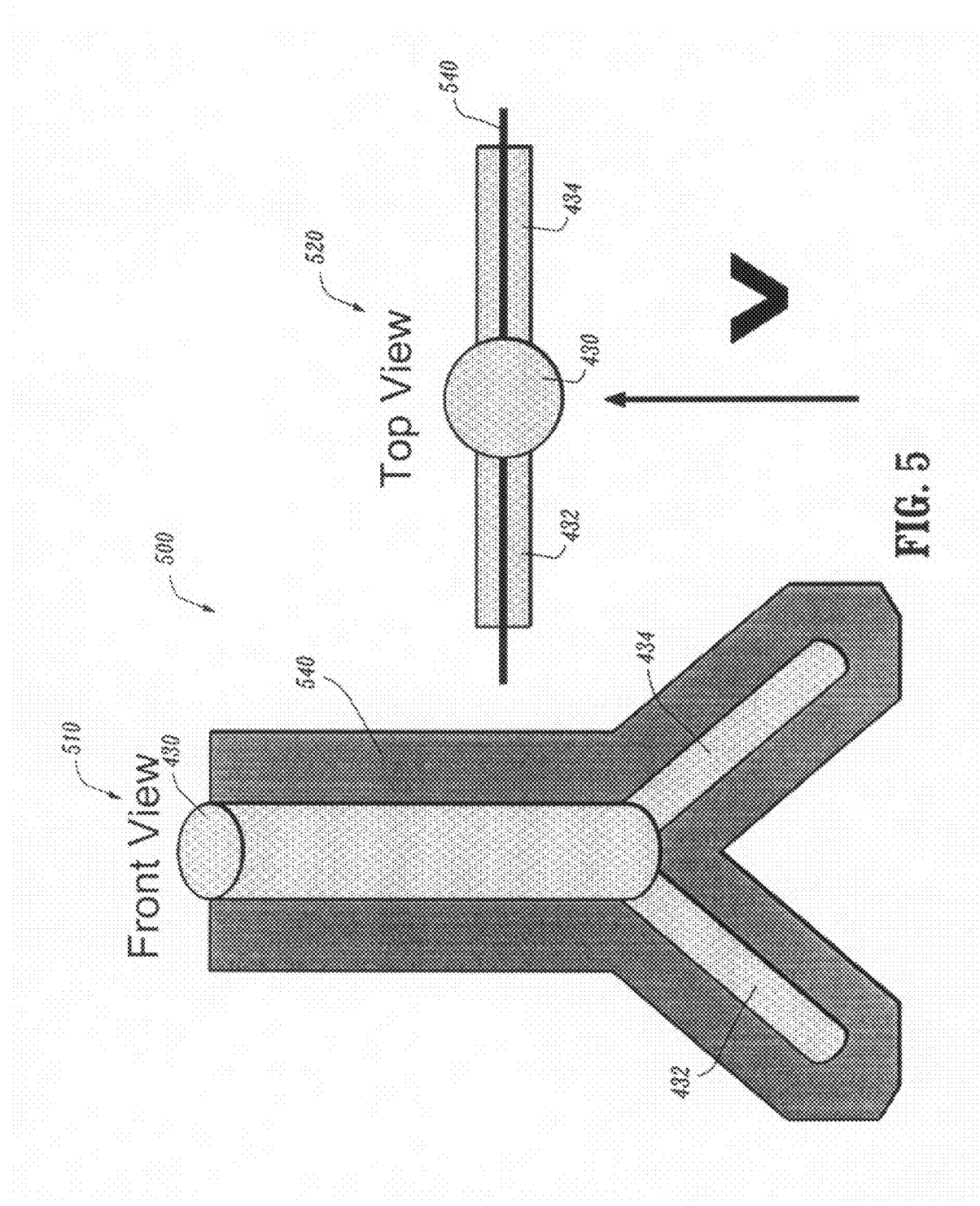

VISUALIZATION OF VOLUME-RENDERED DATA WITH OCCLUDING CONTOUR MULTI-PLANAR-REFORMATS

CROSS-REFERENCE TO RELATED APPLICATION

This application claims the benefit of U.S. Provisional Application Ser. No. 60/550,134, filed Mar. 4, 2004 and entitled "Enhanced Display of Volume Rendered 3D Medical Data with Occluding Contour MPRs", which is incorporated herein by reference in its entirety.

BACKGROUND

Volume rendering is a technique for displaying three-dimensional (3D) data using a classification method called a volume rendering transform (VRT) or transfer function, which maps image intensities to colors and opacities. By varying the parameters of the VRT transfer function, a user can manually cause various structures to become selectively transparent or opaque in the volume-rendered image.

When rendering vascular images, for example, a VRT transfer function is typically set to show the high intensity opacified lumen of a vessel. Viewing a vessel lumen is a useful function that generally helps radiologists detect pathological conditions such as aneurysm or stenosis, but it only tells part of the story. Much of the essential information is not carried in the lumen geometry, but in the contents of the region immediately surrounding the lumen. In healthy vessels, for example, the lumen is immediately adjacent to the vessel wall. In other cases, however, other materials may collect between the vessel lumen and the vessel wall, such as plaque and thrombus, for example. Visualization, measurement and categorization of such other materials would be useful to a clinician.

Typically, plaque and thrombus may be represented in computed tomograpic angiography images (CTA), but other imaging modalities such as magnetic resonance (MR), computed tomography (CT), rotational 3D angiography (3D Angio) and 3D/4D ultrasound may also represent this material. It is currently possible to visualize the lumen alone by adjusting the transfer function in a volume-rendered image. Unfortunately, it is extremely difficult, if not impossible, to simultaneously and globally visualize plaque and lumen automatically, or even semi-automatically, using such a transfer function. Accordingly, what is desired is an automated way to visualize volume-rendered data having occlusions.

SUMMARY

These and other drawbacks and disadvantages of the prior art are addressed by an apparatus and method for the visualization of volume-rendered data with occluding contour multi-planar reformats.

An exemplary system for visualizing volume rendered images relative to a viewing vector includes a processor, a detection unit in signal communication with the processor for detecting occluding contours of opacified structures in the image data, and a resampling unit in signal communication with the processor for generating curved multi-planar-reformat (MPR) resamplings that follow the occluding contours of the opacified structures.

A corresponding method includes receiving a volume rendered image, including distance values and surface normals for every pixel that is opacified, gathering all opacified pixels that are orthogonal to the viewing vector into a group of occluding points, and separating the group of occluding points into individual occluding contours.

These and other aspects, features and advantages of the present disclosure will become apparent from the following description of exemplary embodiments, which is to be read in connection with the accompanying drawings.

BRIEF DESCRIPTION OF THE DRAWINGS

The present disclosure teaches a system and method for the visualization of volume-rendered data with occluding contour multi-planar reformats in accordance with the following exemplary figures, in which:

FIG. 5 shows a schematic diagram of the exemplary three-dimensional shape of FIG. 4 with occluding MPRs in accordance with an illustrative embodiment of the present disclosure.

DETAILED DESCRIPTION OF PREFERRED EMBODIMENTS

An exemplary embodiment of the present disclosure automatically produces a visualization of plaque and lumen simultaneously, by detecting the occluding contours of opacified structures in the image, and then rapidly generating curved multi-planar-reformat (MPR) resamplings that follow the occluding contours of the opacified structures.

Figure 1:
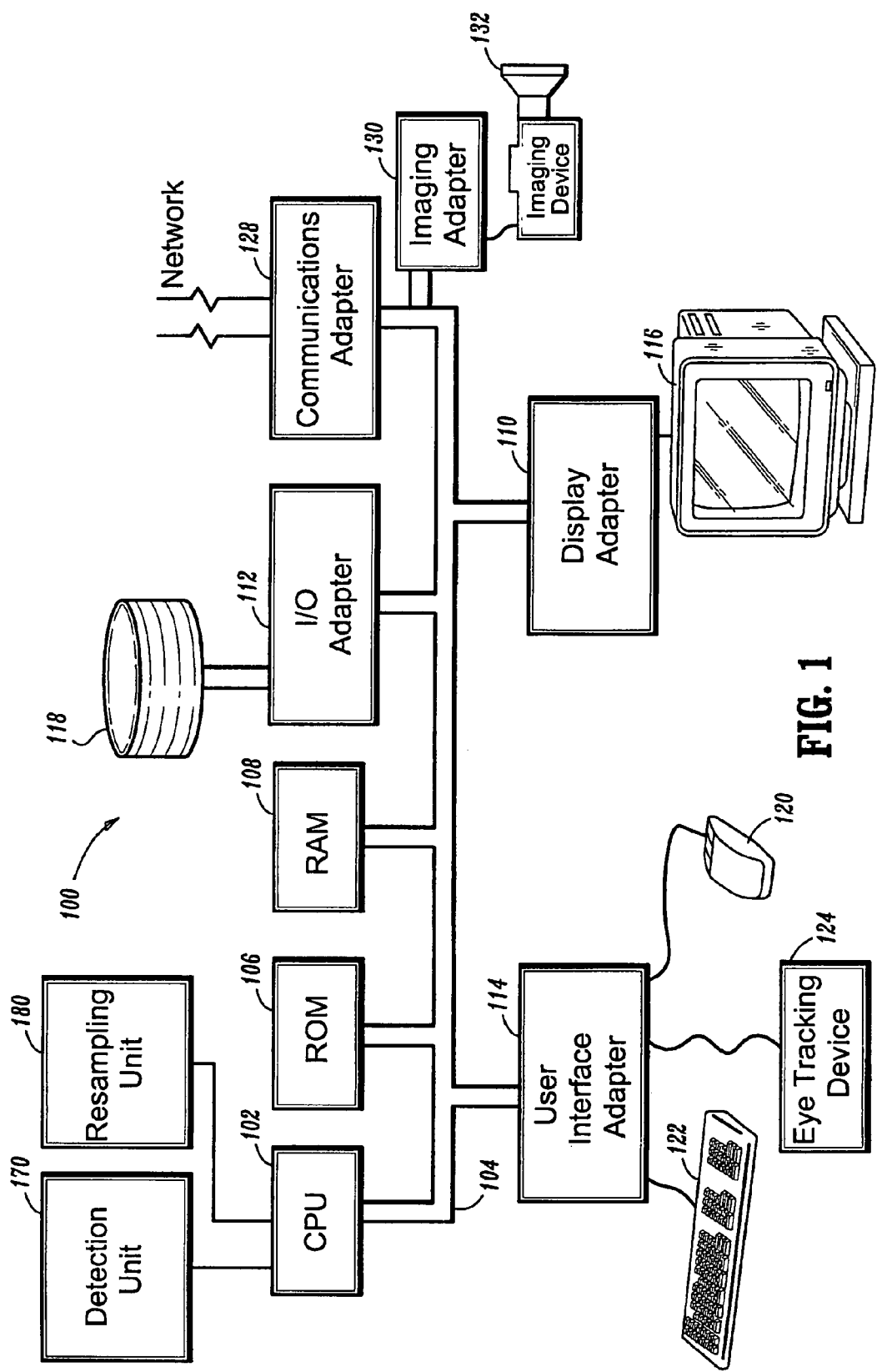
FIG. 1 shows a schematic diagram of a system for the visualization of volume-rendered data with occluding contours in accordance with an illustrative embodiment of the present disclosure.

As shown in FIG. 1, a system for the visualization of volume-rendered data with occluding contours, according to an illustrative embodiment of the present disclosure, is indicated generally by the reference numeral 100. The system 100 includes at least one processor or central processing unit (CPU) 102 in signal communication with a system bus 104. A read only memory (ROM) 106, a random access memory (RAM) 108, a display adapter 110, an I/O adapter 112, a user interface adapter 114, a communications adapter 128, and an imaging adapter 130 are also in signal communication with the system bus 104. A display unit 116 is in signal communication with the system bus 104 via the display adapter 110. A disk storage unit 118, such as, for example, a magnetic or optical disk storage unit is in signal communication with the system bus 104 via the I/O adapter 112. A mouse 120, a keyboard 122, and an eye tracking device 124 are in signal communication with the system bus 104 via the user interface adapter 114. An imaging device 132 is in signal communication with the system bus 104 via the imaging adapter 130.

A detection unit 170 and a resampling unit 180 are also included in the system 100 and in signal communication with the CPU 102 and the system bus 104. While the detection unit 170 and the resampling unit 180 are illustrated as coupled to the at least one processor or CPU 102, these components are preferably embodied in computer program code stored in at least one of the memories 106, 108 and 118, wherein the computer program code is executed by the CPU 102.

Figure 2:
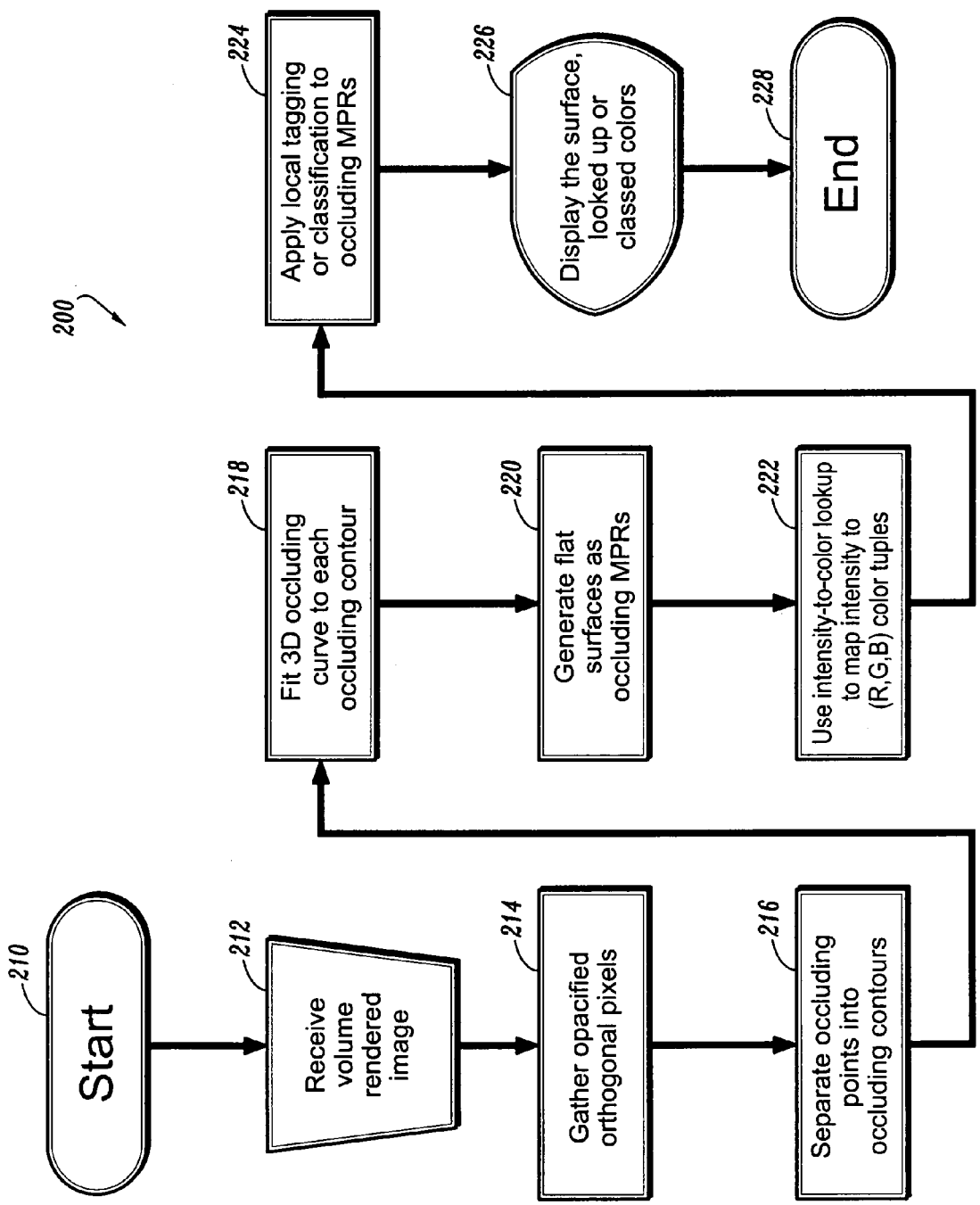
FIG. 2 shows a flow diagram of a method for the visualization of volume-rendered data with occluding contours in accordance with an illustrative embodiment of the present disclosure.

Turning to FIG. 2, a method for the visualization of volume-rendered data with occluding contours, according to an illustrative embodiment of the present disclosure, is indicated generally by the reference numeral 200. The flowchart 200 includes a start block 210 that passes control to an input block 212. The input block 212 receives a volume rendered image including opacity values for every pixel, and also including distance values and surface normals for every pixel that is opacified. The block 212 passes control to a function block 214. The function block 214 gathers all opacified pixels that are orthogonal to the viewer into a group of occluding points, and in turn, passes control to a function block 216. The block 216 separates the group of occluding points into individual occluding contours, and passes control to a function block 218.

The function block 218, in turn, fits a 3D curve to each of the occluding contours to create a set of occluding curves, where each point on a given occluding curve is associated with a surface normal of the opacified object that is orthogonal to the viewing direction V. The block 218 passes control to a function block 220. The block 220 generates flat surfaces to be used as occluding MPRs, and may pass control to an optional function block 222 that uses an intensity-to-color lookup table, for example, to map intensity to (R,G,B) color tuples. Optionally, the blocks 220 or 222 may pass control to a function block 224. The function block 224 may apply local tagging or classification algorithms to the region defined by the occluding MPRs in order to better display tissues and structures that may not be differentiated by application of a simple color map. The blocks 220, 222 and/or 224 pass control to an output block 226 to display the original, looked up and/or classified colors to differentiate materials such as plaque and thrombus by color and/or tag. The block 226 passes control to an end block 228.

Figure 3:
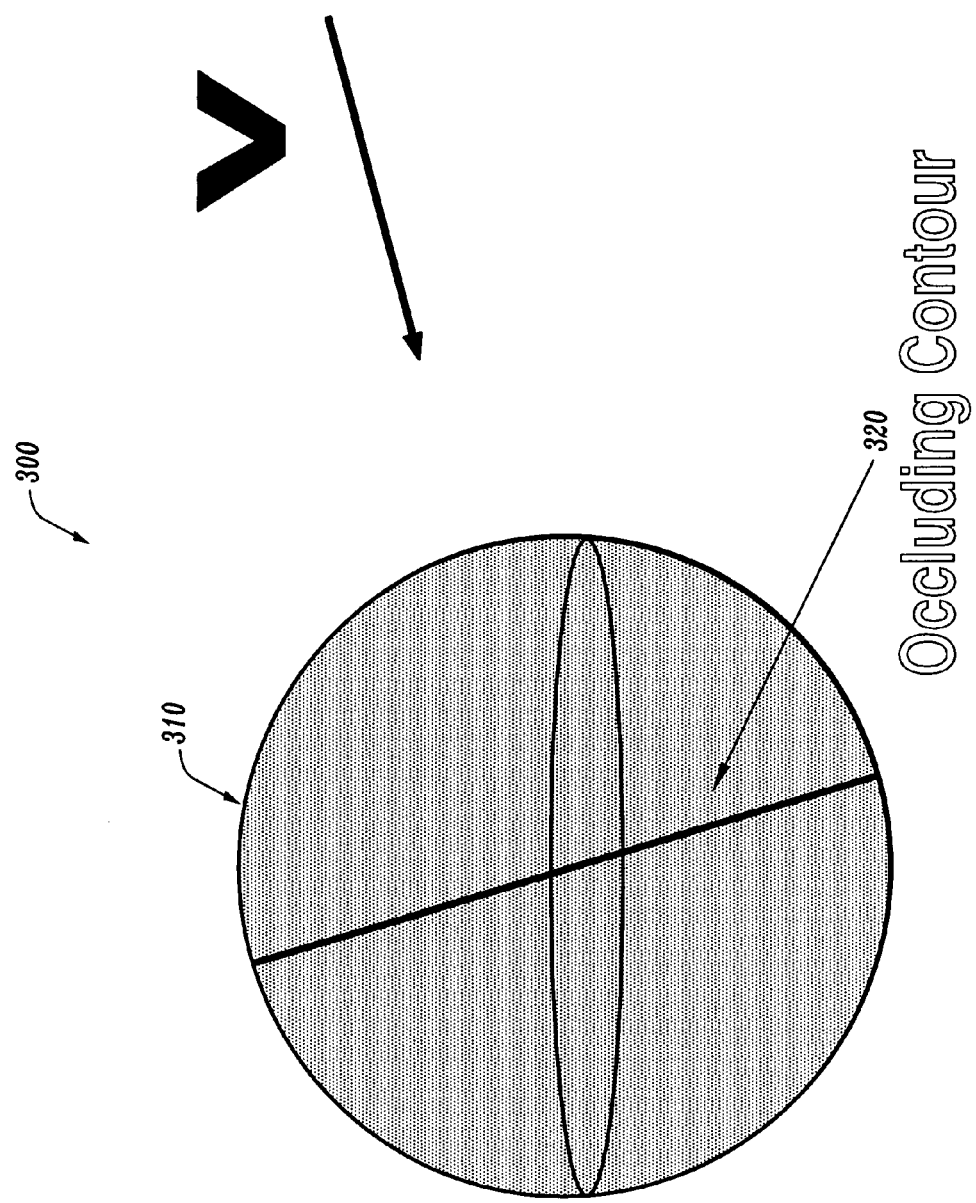
FIG. 3 shows a schematic diagram of an exemplary three-dimensional shape having an occluding contour in accordance with an illustrative embodiment of the present disclosure.

Turning now to FIG. 3, an exemplary three-dimensional (3D) image having an occluding contour is indicated generally by the reference numeral 300. For a simple 3D sphere shape 310, for example, the occluding contour of the sphere is a circle 320. Thus, for a viewing direction V, the occluding contour of the sphere 310 is defined to be the great circle 320 on which the surface normals of the sphere are exactly orthogonal to, or make a 90 degree angle with, the viewing direction V.

Figure 4:
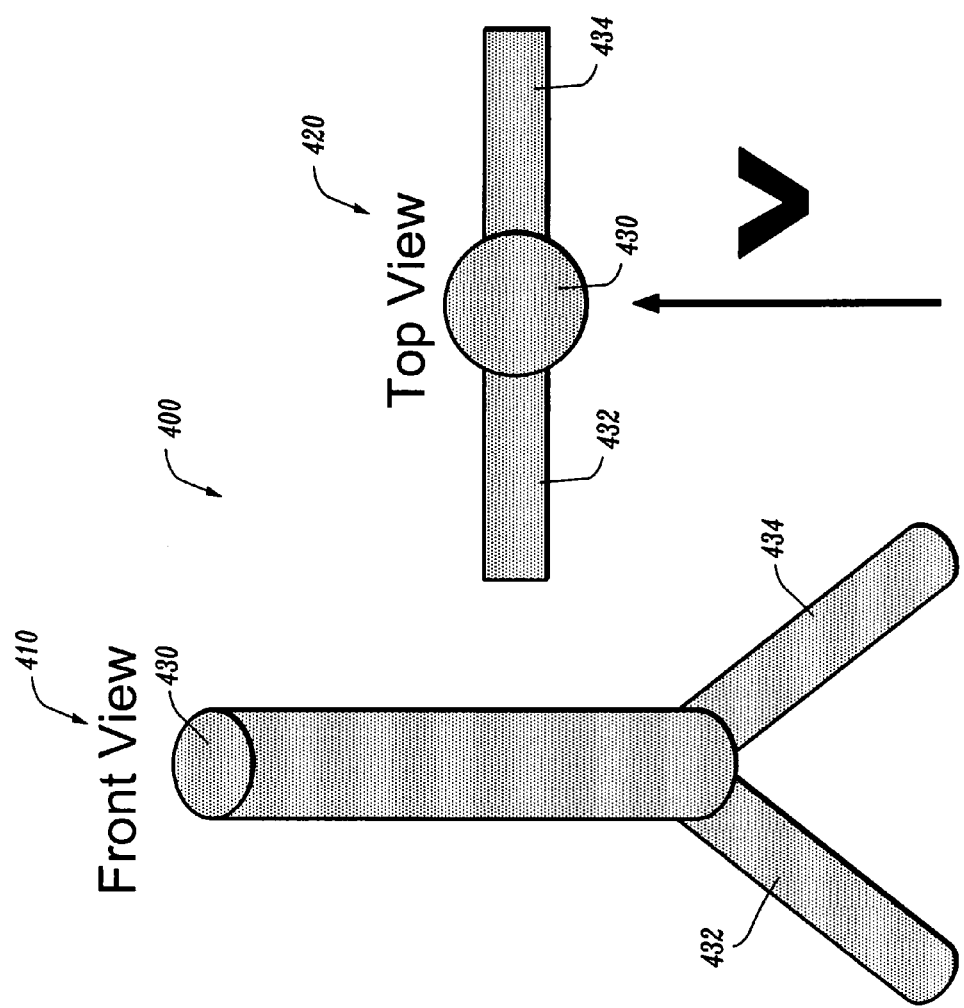
FIG. 4 shows a schematic diagram of another exemplary three-dimensional shape in accordance with an illustrative embodiment of the present disclosure.

As shown in FIG. 4, vascular imagery is indicated generally by the reference numeral 400. A front view vascular image 410 is what a viewer would see when viewing the phantom vascular objects 430, 432 and 434 in the volume rendered image, and a top view vascular image 420 shows the relationship of the view vector V to the objects.

Turning to FIG. 5, vascular imagery with occluding contours is indicated generally by the reference numeral 500. The front view image 510 is like the image 410 of FIG. 4, but also shows the occluding multi-planar-reformat resamplings (MPRs) 540 as they would appear in the front view. Likewise, the top view image 520 is like the image 420 of FIG. 4, but also shows the MPRs 540 in an edge-on representation.

During the process of volume rendering, it is common to simulate light falling on the opacified surfaces. In order to simulate the lighting effects, it is essential to know or to be able to estimate the surface normal of the opacified surfaces in the image at any particular surface voxel. Rendering algorithms may either pre-compute surface normals or compute them on the fly. It is possible to store both the depth value and the surface normal for every completely opacified voxel which is visible in the final rendered image.

Operation of the method 200 of FIG. 2 will now be described in greater detail. Given a rendered image having, for every pixel:

1. Opacity value ALPHA[x,y] for that pixel in the range [0 . . . 1];

2. If the opacity is 1, the distance ZDEPTH[x,y] from the 3D location of that pixel to the position of the viewer; and 3. If the opacity is 1, the surface normal NORMAL[x,y] of the opacified surface voxel.

Then the following algorithm is executed to create a set of occluding curves:

First, gather all pixels [x,y] for which ALPHA[x,y]=1 AND NORMAL[x,y] is orthogonal to viewer into a group OCCLUDING_POINTS.

Next, separate OCCLUDING_POINTS into K individual OCCLUDING_CONTOURS[1 . . . K] by finding the connected components of OCCLUDING_CONTOURS. K is equal to the number of connected components found in OCCLUDING_POINTS.

Next, fit a 3D curve to each member of OCCLUDING_CONTOURS to create a set of curves OCCLUDING_CURVES[1 . . . K].

Each point on a given occluding curve is associated with a surface normal of the opacified object n, which is orthogonal to the viewing direction V. It is now possible to generate flat surfaces of the following form to be used as occluding MPRs:

Given an occluding contour f(t)=(x(t),y(t),z(t)) and the related function n(f(t))=(x(f(t)),y(f(t)),z(f(t))), which gives the unit surface normals associated with each point in f(t), create a surface S(s,t)=f(t)+n(f(t))s. The surface S has certain useful properties for visualization:

1. S(s,t) is continuous if f(t) & n(f(t)) are continuous.

2. S(s,t) includes the contour f(t) plus offsets of the contour f(t) moving away from the opacified structure in the direction of the surface normal if s is restricted to positive or zero values.

3. S(s,t) is visible to the viewer if f(t) is visible to the viewer.

Intuitively, the surface S(s,t),s in [0 . . . k] is the locus of points swept out by a line segment of length k as it is moved along f(t) with orientation always aligned with the normal of the opacified surface at f(t).

Let the intensity of the volume at a given position [x,y,z] be denoted by the function I(x,y,z). The surface S(s,t) can be displayed as an opaque surface in the image with the color of the surface at S(s,t)=I(S(s,t)). Optionally, an intensity-to-color lookup table can be used. For example, let T:R->R3 be a function that maps intensity to (R,G,B) color tuples. The surface S could then be displayed with color of the surface at S(s,t)=T(I(S(s,t))). This permits special lookup tables to be used that can differentiate materials such as plaque and thrombus by color. Optionally, local tagging or classification algorithms can be applied to the region defined by the occluding MPRs in order to better display tissues and structures that may not be differentiated by application of a simple color map.

Thus, the apparatus 100 of FIG. 1 uses the method 200 of FIG. 2 to view objects, such as the vascular objects 430, 432 and 434 of FIG. 4, with occluding MPRs, such as the occluding MPRs of FIG. 5. Accordingly, the occluding MPRs 540 of FIG. 5 are shown as they would appear in the front view and also shown in an edge-on representation in the top view.

In alternate embodiments of the apparatus 100, some or all of the computer program code may be stored in registers located on the processor chip 102. In addition, various alternate configurations and implementations of the detection unit 170 and the resampling unit 180 may be made, as well as of the other elements of the system 100.

It is to be understood that the teachings of the present disclosure may be implemented in various forms of hardware, software, firmware, special purpose processors, or combinations thereof. Most preferably, the teachings of the present disclosure are implemented as a combination of hardware and software.

Moreover, the software is preferably implemented as an application program tangibly embodied on a program storage unit. The application program may be uploaded to, and executed by, a machine comprising any suitable architecture. Preferably, the machine is implemented on a computer platform having hardware such as one or more central processing units (CPU), a random access memory (RAM), and input/output (I/O) interfaces.

The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present disclosure is programmed. Given the teachings herein, one of ordinary skill in the pertinent art will be able to contemplate these and similar implementations or configurations of the present disclosure.

Although the illustrative embodiments have been described herein with reference to the accompanying drawings, it is to be understood that the present disclosure is not limited to those precise embodiments, and that various changes and modifications may be effected therein by one of ordinary skill in the pertinent art without departing from the scope or spirit of the present disclosure. All such changes and modifications are intended to be included within the scope of the present disclosure as set forth in the appended claims.

What is claimed is:

1. A method for visualizing volume rendered images relative to a viewing vector, comprising:

receiving a volume rendered image, including distance values and surface normals for every pixel that is opacified;

gathering all opacified pixels that are orthogonal to the viewing vector into a group of occluding points; and separating the group of occluding points into individual occluding contours;

fitting a three-dimensional curve to each of the occluding contours to create a set of occluding curves, where each point on an occluding curve is associated with a surface normal of an opacified object that is orthogonal to the viewing vector; and displaying a region responsive to the viewing vector and at least one of the individual occluding contours.

2. A method as defined in claim 1, further comprising generating flat surfaces from the set of occluding contours to be used as occluding multi-planar-reformat (MPR) resamplings.

3. A method as defined in claim 2, further comprising applying an intensity-to-color lookup table to the region defined by the occluding MPR resamplings to map intensities to color tuples.

4. A method as defined in claim 2, further comprising applying at least one of a local tagging algorithm and a classification to the region defined by the occluding MPR resamplings in order to differentiate materials.

5. A method as defined in claim 2 wherein the displayed region is defined by the occluding MPR resamplings.

6. An apparatus for visualizing volume rendered image data relative to a viewing vector, comprising:

a processor;

a detection unit in signal communication with the processor for detecting individual occluding contours of opacified structures in the image data;

a resampling unit in signal communication with the processor for generating curved multi-planar-reformat (MPR) resamplings that follow the individual occluding contours of the opacified structures; and a display adapter in signal communication with the processor for displaying a region responsive to the viewing vector and at least one of the individual occluding contours, wherein the processor is disposed for fitting a three-dimensional curve to each of the occluding contours to create a set of occluding curves, where each point on an occluding curve is associated with a surface normal of an opacified object that is orthogonal to the viewing vector.

7. An apparatus as defined in claim 6, further comprising at least one of an imaging adapter and a communications adapter in signal communication with the processor for receiving image data.

8. An apparatus as defined in claim 6, further comprising an input/output adapter in signal communication with the processor for storing distance values and surface normals for every pixel that is opacified in a volume rendered image.

9. An apparatus as defined in claim 6, further comprising a user interface adapter in signal communication with the processor for defining a viewing vector from which all opacified pixels that are orthogonal to the viewing vector are gathered into a group of occluding points.

10. An apparatus as defined in claim 6, wherein the display adapter is disposed for displaying a region defined by the occluding MPR resamplings.

11. An apparatus for visualizing volume rendered image data relative to a viewing vector, comprising:

rendering means for receiving a volume rendered image, including distance values and surface normals for every pixel that is opacified;

vector resolving means for gathering all opacified pixels that are orthogonal to the viewing vector into a group of occluding points;

point separation means for separating the group of occluding points into individual occluding contours;

curve fitting means for fitting a three-dimensional curve to each of the occluding contours to create a set of occluding curves, where each point on an occluding curve is associated with a surface normal of an opacified object that is orthogonal to the viewing vector; and display means for displaying a region responsive to the viewing vector and at least one of the individual occluding contours.

12. An apparatus as defined in claim 11, further comprising resampling means for generating flat surfaces from the set of occluding contours to be used as occluding multi-planar-reformat (MPR) resamplings.

13. An apparatus as defined in claim 12, further comprising look-up means for applying an intensity-to-color lookup table to the region defined by the occluding MPR resamplings to map intensities to color tuples.

14. An apparatus as defined in claim 12, further comprising differentiation means for applying at least one of a local tagging algorithm and a classification to the region defined by the occluding MPR resamplings in order to differentiate materials.

15. An apparatus as defined in claim 12, wherein the display means is disposed for displaying the region defined by the occluding MPR resamplings.

16. A program storage device readable by machine, tangibly embodying a program of instructions executable by the machine to perform program steps for visualizing volume rendered images relative to a viewing vector, the program steps comprising:
    receiving a volume rendered image, including distance values and surface normals for every pixel that is opacified;
    gathering all opacified pixels that are orthogonal to the viewing vector into a group of occluding points;
    separating the group of occluding points into individual occluding contours; and
    fitting a three-dimensional curve to each of the occluding contours to create a set of occluding curves, where each point on an occluding curve is associated with a surface normal of the opacified object that is orthogonal to the viewing vector.

17. A device as defined in claim 16, the program steps further comprising generating flat surfaces from the set of occluding contours to be used as occluding multi-planar-reformat (MPR) resamplings.

* * * * *